US012212910B2

(12) United States Patent
Burke et al.

(10) Patent No.: US 12,212,910 B2
(45) Date of Patent: Jan. 28, 2025

(54) DUAL CONNECTOR MICROPHONE

(71) Applicant: Freedman Electronics Pty Ltd, Silverwater (AU)

(72) Inventors: Ryan Burke, Silverwater (AU); Pieter Schillebeeckx, Silverwater (AU)

(73) Assignee: Freedman Electronics Pty Ltd, Silverwater (AU)

( * ) Notice: Subject to any disclaimer, the term of this patent is extended or adjusted under 35 U.S.C. 154(b) by 218 days.

(21) Appl. No.: 17/979,301

(22) Filed: Nov. 2, 2022

(65) Prior Publication Data

US 2024/0147104 A1 May 2, 2024

(51) Int. Cl.
*H04R 1/08* (2006.01)

(52) U.S. Cl.
CPC .................................... *H04R 1/08* (2013.01)

(58) Field of Classification Search
CPC ......... H04R 1/08; H04R 1/04; H04R 2420/09
USPC ................................................ 381/122, 334
See application file for complete search history.

(56) References Cited

U.S. PATENT DOCUMENTS 5,404,315 A * 4/1995 Nakano .................. H03G 7/007 327/331
7,104,844 B2 * 9/2006 Akino .................... H01R 24/40 439/620.21
8,744,097 B2 * 6/2014 Nakazawa ............... H04R 1/04 381/355
2008/0144875 A1 * 6/2008 Akino .................... H04R 1/086 381/361
2010/0061559 A1 * 3/2010 Wu ......................... H04R 1/08 381/26
2011/0263270 A1 * 10/2011 Roy ......................... H01Q 9/04 455/456.1
2017/0033754 A1 * 2/2017 Perrott ................... H04H 60/04
2021/0160611 A1 * 5/2021 Balgemann .............. H04R 3/04
2022/0272452 A1 * 8/2022 Grosz ..................... H03F 3/183
2022/0272473 A1 * 8/2022 Shumard .................. H04R 3/00

FOREIGN PATENT DOCUMENTS

CN 201278577 7/2009
CN 215344981 12/2021
EP 3745737 12/2020

OTHER PUBLICATIONS

Richbourg, Smythe; Maono AU-HD300T Pro Mic System Review; The Gadgeteer; Jan. 3, 2022.

(Continued)

*Primary Examiner* — Norman Yu
(74) *Attorney, Agent, or Firm* — Lathrop GPM LLP; Richard Beem; Alex Shtraym

(57) ABSTRACT

The present invention relates generally to the field of microphone connectors, and more particularly to a dual connector including an analog connector and a digital port. The digital port may be positioned directly adjacent or within the analog connector. For example, a Type-C USB port may positioned directly above one or more pins of an XLR connector or between one or more pins of the XLR connector. Advantageously, the microphone may be configured to connect with a variety of host devices and may facilitate functioning as a USB-C microphone via the digital port for producing a 32-bit floating-point recording or audio stream.

20 Claims, 6 Drawing Sheets

(56) References Cited

OTHER PUBLICATIONS

Heinzman, Andrew; Samson Q9U Broadcast Mic Review: An Easy and Affordable Mic With USB-C and XLR; Review Geek; Apr. 5, 2021.

Using Multiple USB Microphones on the Same Computer; Cleanfeed.

Audio-Technica AT2005USB Cardioid Dynamic USB/XLR Microphone; soundpro.com.

Shure MV7 USB Podcast Microphone for Podcasting, Recording, Live Streaming & Gaming, Built-In Headphone Output, All Metal USB/XLR Dynamic Mic, Voice-Isolating Technology, Teamspeak Certified—Black; ubuy.com.

* cited by examiner

DUAL CONNECTOR MICROPHONE

FIELD OF THE INVENTION

The present invention relates generally to the field of microphones, and more particularly to a microphone including a dual connector.

BACKGROUND

Microphones, such as directional microphones, are widely used in various applications such as professional or home music recording, news gathering, sporting events, outdoor film recording, and content creation. Once audio is captured, it can be output to one or more devices via a wireless or wired connection.

Wired microphones typically include an audio interface for outputting the audio to another device. For example, conventional microphones may include an optical interface, a universal serial bus (USB), a three-pin external line return (XLR), a tip and sleeve (TS) connector, a tip, ring, and sleeve (TRS) connector, and the like.

To accommodate for the variety of audio connectors in the market, certain microphones may include a plurality of analog and/or digital interfaces. However, wired microphones that utilize an analog input often rely on the host device to enhance the sound and performance of the audio.

Conventional microphones with a digital or USB connection typically include a single analog-to-digital converter (ADC) for one or more input channels. This often results in a non-simultaneous sampling on individual channels and ultimately in degradation of performance. In addition, conventional microphones often require sorting through dual recording in post-production to find unclipped tracks. Typically, a USB or digital microphone with have a limited usable dynamic range dictated by the the fixed or variable gain applied to the microphone, which is fed into a single or dual analogue to digital converter at 24 bits or less. In the event that the audio signal exceeds the maximum range allowable by the Analogue to digital converter, the signal is clipped and the quality is therefore degraded.

Therefore, there is a need for a microphone that is configured to route audio signals to each available interface for recording of low distortion, high dynamic range audio that exceeds that of a single analogue to digital converter.

SUMMARY

The present invention relates generally to the field of microphones, and more particularly to a microphone having a dual connector including an analog connector and a digital port. Advantageously, the microphone may be configured to connect with a variety of host devices and may facilitate functioning as a USB-C microphone via the digital port for producing an improved audio signal recording.

In one aspect, the microphone may include an insert having an XLR connector. The insert may include a cutout configured to receive a Type-C USB port. In particular, the cutout may be arranged such that the Type-C USB port is positioned directly adjacent or vertically between one or more pins of an analog connector. A grounding bracket may be configured to couple to one or more pins of the analog connector. The grounding bracket may be secured to the insert via a grounding screw.

Further, the microphone may include a printed circuit board (PCB) secured between the analog connector and the digital connector. The PCB may be a double-sided printed circuit board having a first surface and a second surface. PCB may include switching circuitry for selectively powering the microphone circuitry or capsule. Further, PCB may include processing circuitry for generating an output signal.

Moreover, the processing circuitry may include a microprocessor for audio signal processing to enhance the sound and performance of the microphone when connected to a host device via the digital port. Specifically, processing circuitry may be configured to split the audio signal into two or more processed signals. Each processed signal may correspond to a fixed decibel level offset of audio received by a capsule of the microphone. For example, the audio may be split into four processed signals, such that the fixed decibel level offset of each processed signal is between 0 dB and about 60 dB.

In another aspect, the microphone may be configured to monitor samples of the audio according to a sampling interval or frequency. In particular, the processing circuitry may be configured to monitor each processed signal to detect a highest gain processed signal with the best available signal to noise ratio. Further, the processing circuitry may be configured to selectively switch between two or more analog-to-digital converters (ADC) based on the ideal gain processed signal, corresponding to the signal with the highest signal-to-noise ratio without any overloading or clipping present.

By monitoring the lowest gain signal, the processing circuitry may facilitate monitoring the signal with a goal of switching to a “highest” gain ADC that has not clipped, for each given sampled section of audio, such as sampling interval of 8 samples. In other words, by having a higher gain level, the processing circuitry is configured to determine the signal furthest from the noise floor, therefore providing an optimal signal-to-noise ratio available for that sample of audio. The processing circuitry may then then stitch or combine the samples together, the signal is always at an ideal signal-to-noise ratio. For example, a whisper input would result in the highest gain signal being chosen, therefore matching the input signal, whereas a jet engine would receive the lowest gain signal, so it did not clip.

More specifically, processing circuitry may be configured to select an ADC to produce a digital signal of a processed audio sample. To select the ADC, the processing circuitry may monitor the lowest gain processed signal because it may have the most signal headroom, in order to predict the signal with the highest gain that is free from clipping or distortion i.e., the highest signal-to-noise ratio. The processing circuitry may then combine the digital signals produced by switching seamlessly between the digital signal produced from the ADC for each sample of audio, selecting the ideal ADC for each sample of audio for the reconstruction. Further, processing circuitry may be configured to apply the appropriate digital gain offset to account for the analog gain difference between each ADC input.

Once digital signals from corresponding ADCs are combined, the microphone may be configured to generate an output signal. The output signal may be a 32-bit floating-point recording or audio stream that facilitates recovering clipped recordings with no distortion and capturing a large dynamic range to, for example, reduce the need for gain adjustments required and avoid sorting through dual-recordings in post-production.

In yet another aspect, the disclosure may relate to a retrofit kit for a microphone or other audio device. Retrofit kit may include an XLR connector a Type-C USB port. USB port may be positioned directly adjacent or vertically between one or more pins of the XLR connector. Further, a grounding bracket may be configured to couple with a pin of XLR port and be secured via a grounding screw.

As disclosed above, the retrofit kit may include a PCB secured between the XLR connector and Type-C USB port. PCB may include switching circuitry for selectively powering a capsule or other electronics and processing circuitry for generating an output signal. Advantageously, retrofit kit may facilitate updating a microphone or other audio device to function as a USB-C microphone for producing an improved audio signal recording, such as a 32-bit floating-point recording.

While the invention is susceptible to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

BRIEF DESCRIPTION OF THE DRAWINGS

Embodiments are illustrated by way of example and not limitation in the figures in the accompanying drawings, in which like references indicate similar elements and in which.

DETAILED DESCRIPTION OF THE INVENTION

The present invention relates generally to the field of microphone connectors, and more particularly to a dual connector including an analog connector and a digital port. The digital port may be positioned directly adjacent or within the analog connector. For example, a Type-C USB port may positioned directly above one or more pins of an XLR connector or between one or more pins of the XLR connector. Advantageously, the microphone may be configured to connect with a variety of host devices and may facilitate functioning as a USB-C microphone via the digital port for producing an enhanced output signal, such as a 32-bit floating-point recordin0Turning now to the drawings wherein like numerals represent like components, FIGS. 1-4 illustrate an exemplary microphone 100. As shown, microphone 100 may include a capsule 102, printed circuit board 104, and a housing assembly 106. It is contemplated that microphone 100 may be any type of microphone including, for example, a condenser or capacitor, dynamic, carbon, piezo, liquid, micro-electromechanical System (MEMS) or silicon, laser, or speaker microphone.

Capsule 102 of microphone 100 may include an arrangement of field effect transistors to, for example, achieve low noise. In addition, capsule 102 may be electrically connect to one or more audio interfaces via PCB 104, as detailed below.

Further, capsule 102 may be configured to convert sound waves into electrical signals. Although not shown, capsule 102 may include a flexible diaphragm and an insulated electrode referred to as a backplate. The diaphragm and backplate form the two plates of a capacitor, which, in the absence of a sound wave, will have a very small but definite capacitance. When a sound wave displaces the diaphragm, the capacitance will either be increased above or reduced below a resting value; depending upon whether the sound wave pushes the diaphragm toward the backplate or causes it to bow out away from the backplate.

Figure 1:
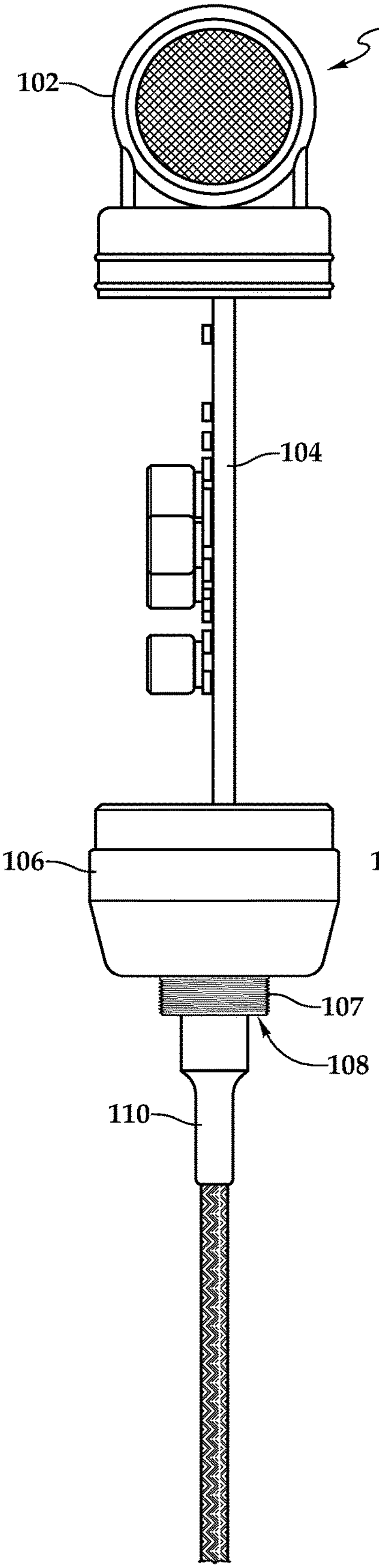
FIG. 1 illustrates an exemplary microphone coupled to a digital interface.
Figure 2:
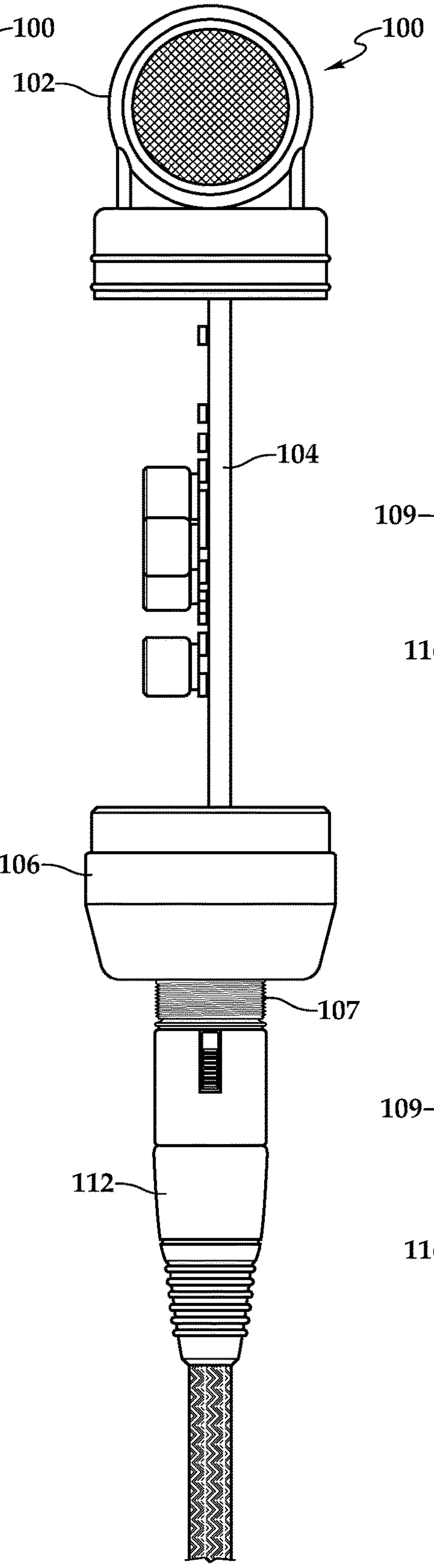
FIG. 2 illustrates the microphone of FIG. 1 coupled to an analog interface.

Housing 106 may be cylindrical in shape and may further include a downwardly extending threaded portion 107, which may be configured to mate with corresponding threads of, for example, a stand, tripod, suspension mount, and the like. Further, housing 106 may include an opening 108 configured to receive an insert 109 including one or more connectors, as detailed below. A radius of insert 109 may range between about five millimeters and about fifteen millimeters, and preferably between about seven millimeters and about nine millimeters. As illustrated in FIG. 1 and FIG. 2, microphone 100 may be configured to facilitate connecting with various devices, such as via a digital cable 110 and/or an analog cable 112.

Figure 3:
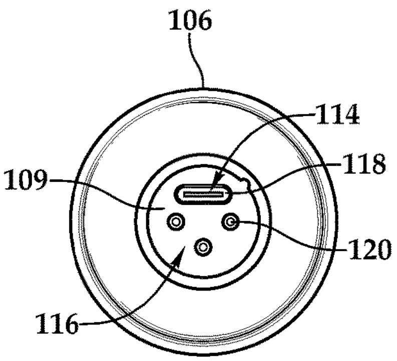
FIG. 3 illustrates the microphone of FIG. 1 including a Type-C USB port positioned directly adjacent to pins of an XLR connector.
Figure 4:
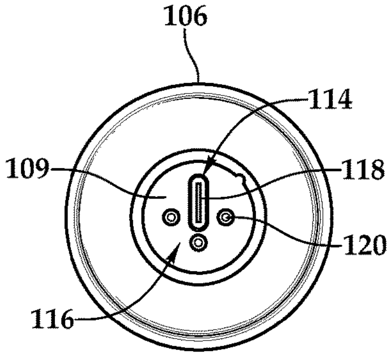
FIG. 4 illustrates the microphone of FIG. 1 including a Type-C USB port positioned between pins of an XLR connector.

As shown in FIGS. 3-4, microphone 100 may include two or more audio interfaces. Audio interfaces may include a digital port 114 and an analog connector 116. Digital port 114 may include, for example, a USB Type-C connector, a USB Mini connector, an RCA connector, a High-Definition Multimedia Interface (HDMI) connector, a DisplayPort connector, and the like. Analog connector 116 may include, for example, a tip-sleeve (TS) connector, a tip-ring-sleeve (TRS) connector, a tip-ring-ring-sleeve (TRRS) connector, an RCA connector, an analogue XLR connector, or digital XLR connector, and the like. Audio interfaces may facilitate transmitting audio signals, such as analog or digital frequencies to, for example, a host device such as a camera, computer, audio mixer, tablet, or mobile device.

Digital port 114 is preferably a Type-C USB port 118 and analog connector is preferably a three-pin external line return (XLR) connector 120. As shown in FIG. 3, USB Type-C port 118 may be configured to be positioned directly adjacent to said one or more pins of said XLR connector 120. For instance, USB Type-C port 118 may be positioned directed above the top two pins of XLR connector 120 within mounting component 108. As shown in FIG. 4, USB Type-C port 118 may be positioned vertically between the pins of XLR connector 120 within mounting component 108. A distance between one or more pins of XLR connector 120 and USB Type-C port 118 may range between about one millimeter and about five millimeters, and preferably between about two millimeters and about four millimeters.

FIGS. 5-18 illustrate additional details of microphone 100. As shown, XLR connector 120 may have three conductive contact pins 122*a*, 122*b*, 122*c* held in place by insert 109. Contact pins 122*a*, 122*b*, 122*c* may equate respectively to contact pin 1, contact pin 2, and contact pin 3. These pin numbers may be used to designate the pin location on the connector, as known in the industry. For example, contact pin 1 may be for connection to ground, contact pin 2 may be for connection to a positive polarity of audio circuitry, and contact pin 3 may be for connection to the negative polarity of audio circuitry. Although XLR connector 120 is shown to have three pins, XLR connectors with other pin-numbers are contemplated, such as XLR connectors having four, five, six, and seven pins.

Insert 109 may further include soldering cups 124*a*, 124*b*, and 124*c*. Soldering cups 124*a*, 124*b*, and 124*c* may be portions of contact pins 122*a*, 122*b*, and 122*c* respectively, projecting from a rear surface of the insert 109. Soldering cups 124*a*, 124*b*, and 124*c* may be configured to electrically couple with PCB 104, as detailed below.

FIGS. 5-18 further illustrate different configurations of a grounding bracket 126. As shown, grounding bracket may be configured to couple to one or more pins of XLR connector 120. Grounding bracket 126 may include a pin receiving section 128, such as a slot, hole or other receptacle. Pin receiving section 128 may be tapered, curved or outwardly biased to ensure a good electrical connection.

As shown in the configuration of FIG. 5 and FIGS. 7-12, a traverse cross section of grounding bracket 126 may substantially L-shaped. In particular, grounding bracket 126 may include a first leg 130 extending transverse to a second leg 132. As illustrated, first leg 130 may couple to grounding pin 122*a* via pin receiving section 128 and second leg 132 may engage a side surface 111 of insert 109 for securing grounding bracket 126 to housing 106 via a grounding screw 134.

As shown in the configuration of FIG. 6 and FIGS. 13-18, grounding bracket 126 may include first leg 126 or a contact portion 136 and a curved portion 138. As illustrated, contact portion 136 may couple to grounding pin 122*a* via pin receiving section 128 and curved portion may extend transverse to contact portion to engage a side surface 111 and curve upwardly to a top surface 113 of insert 109 for securing grounding bracket 126 to housing 106 via a grounding screw 134.

Figure 5:
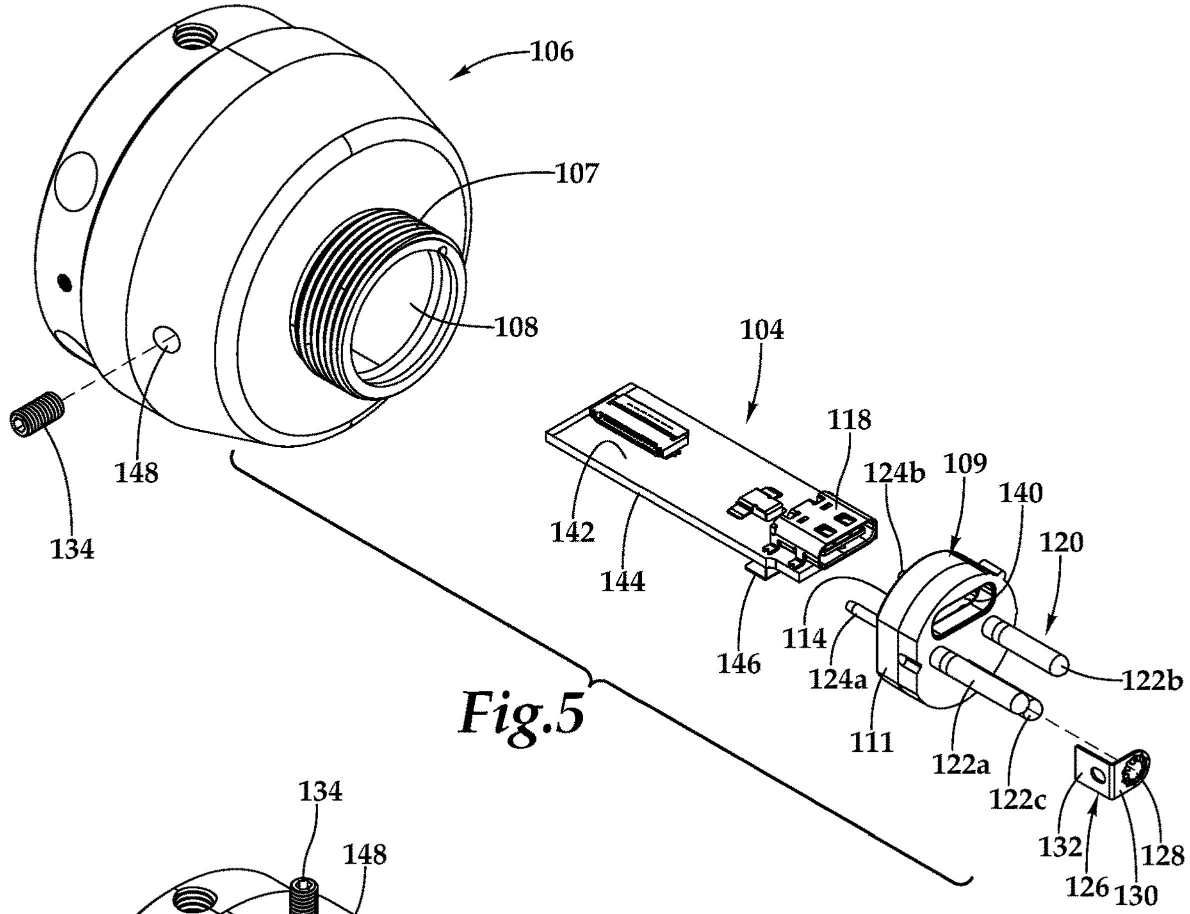
FIG. 5 illustrates an exploded view of the microphone of FIG. 1 including an L-shaped grounding bracket.
Figure 6:
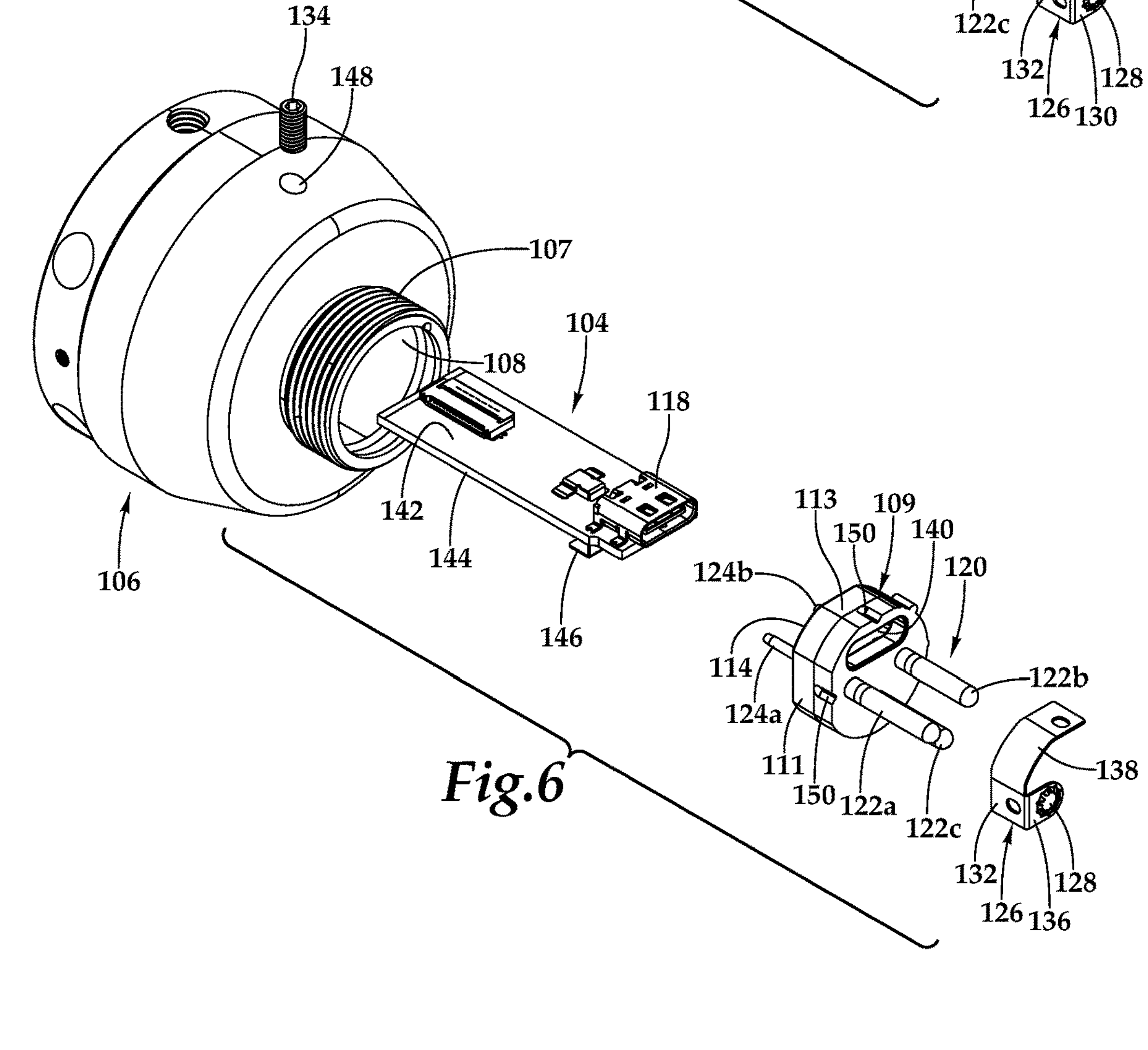
FIG. 6 illustrates an exploded view of the microphone of FIG. 1 including a curved grounding bracket.
Figure 9:
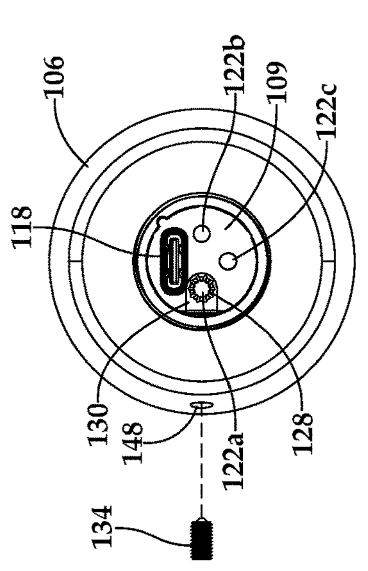
FIG. 9 illustrates a front view of a grounding screw and housing of the microphone of FIG. 5.
Figure 8:
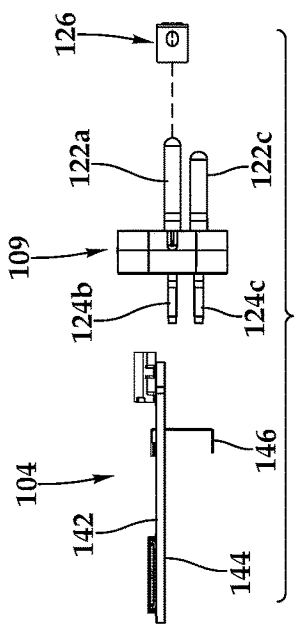
FIG. 8 illustrates a side view of components of the microphone of FIG. 5.
Figure 7:
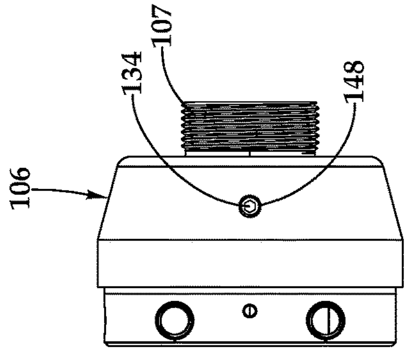
FIG. 7 illustrates a side view of a housing of the microphone of FIG. 5.
Figure 12:
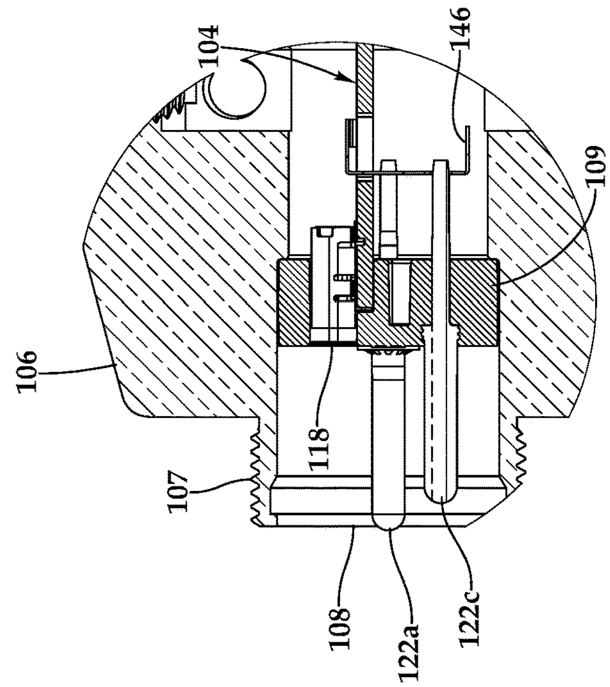
FIG. 12 illustrates a enlarged view of the insert and housing of FIG. 11.
Figure 11:
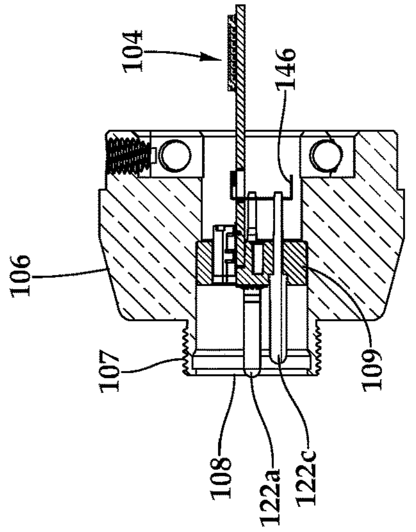
FIG. 11 illustrates a sectional view of the insert and housing of FIG. 10.
Figure 10:
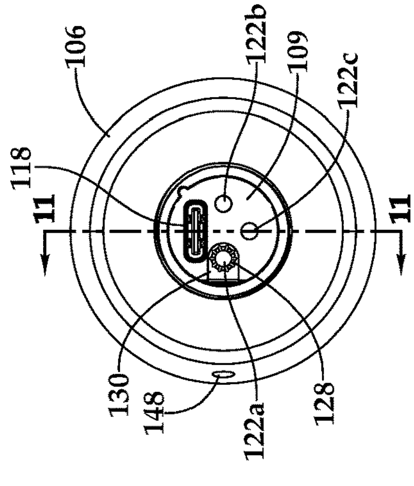
FIG. 10 illustrates a front view of an insert and housing of the microphone of FIG. 5.
Figure 15:
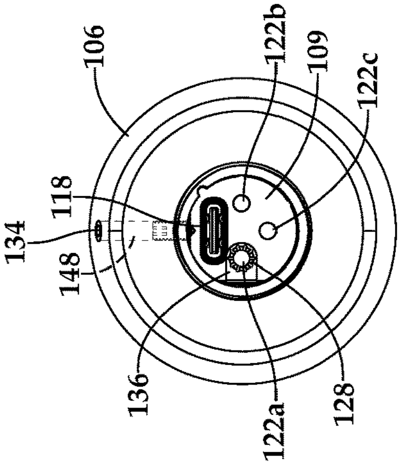
FIG. 15 illustrates a front view of a grounding screw and housing of the microphone of FIG. 6.
Figure 18:
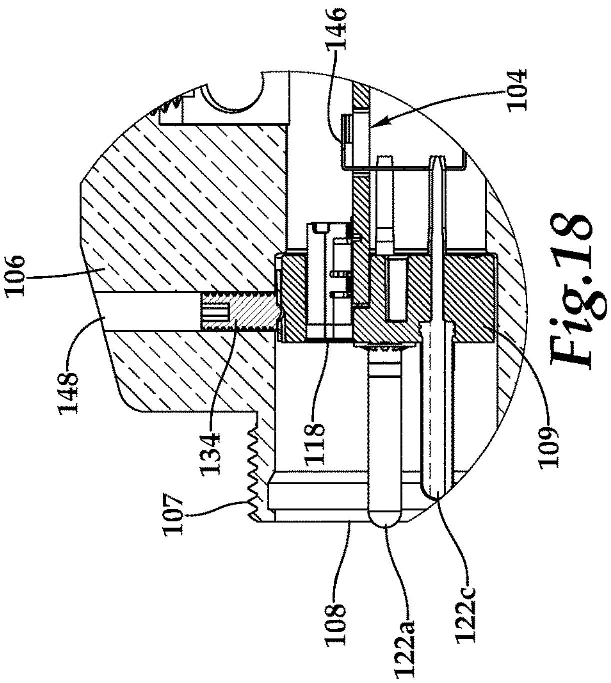
FIG. 18 illustrates a enlarged view of the insert and housing of FIG. 17.
Figure 14:
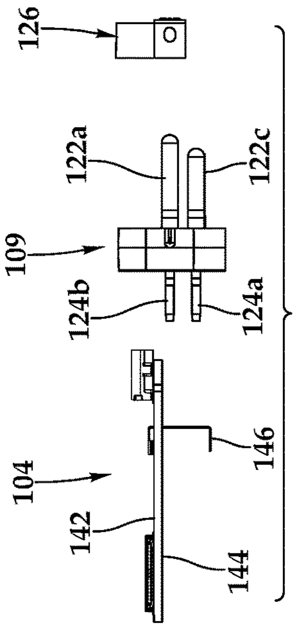
FIG. 14 illustrates a side view of components of the microphone of FIG. 6.
Figure 17:
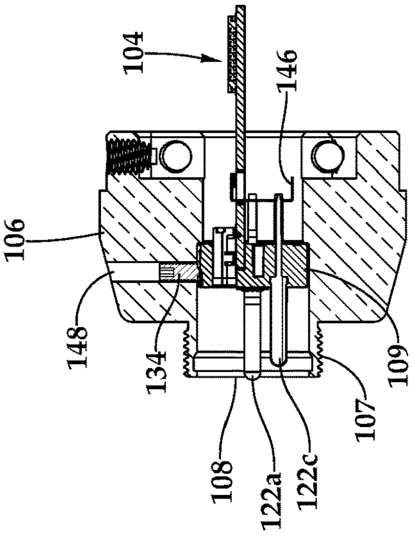
FIG. 17 illustrates a sectional view of the insert and housing of FIG. 16.
Figure 13:
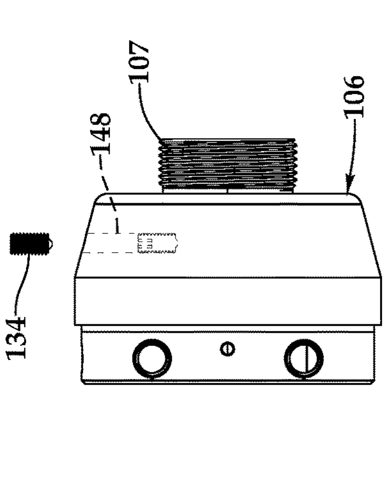
FIG. 13 illustrates a side view of a housing of the microphone of FIG. 6.
Figure 16:
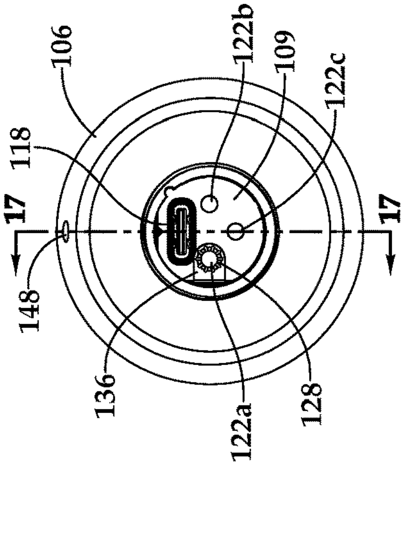
FIG. 16 illustrates a front view of an insert and housing of the microphone of FIG. 6.

Further, insert 109 may include a cutout 140. While cutout 140 is shown in FIGS. 5-6 as being directly horizontally above and adjacent to contact pins 122*a*, 122*b*, it is contemplated that cutout 140 may be positioned vertically (FIG. 4) between contact pins 122*a*, 122*b*, 122*c*. Cutout 140 is adapted to receive USB Type-C port 118 electrically coupled to PCB 104.

As shown, PCB 104 may be secured between Type-C USB port 118 and analog connector 120. More specifically, PCB 104 may be a double surface mounted flexible printed circuit board. PCB 104 may include a first surface 142 and an opposite second surface 144. Both surfaces 142, 144 may include electronic components mounted thereon, as detailed below. While in the present disclosure, electronic components of each surface are different, it is contemplated that electronic components of first surface 142 may be the same as electronic components of second surface 144.

First surface 142 may include USB Type-C port 118 mounted thereon. USB Type-C port 118 may enable a connection with a USB device in multiple cable orientations. Port 118 may be a multi-mode port that can support a number of different protocols. Pins included in USB Type-C port 118 may include SuperSpeed pins, USB 2.0 pins, Auxiliary pins, Power pins, Ground pins, and Configuration channel (CC) pins. SuperSpeed signals may be used to implement USB 3.1 signaling, while USB 2.0 pins may be used to implement USB 2.0 functionality. Auxiliary Signal Pins may be used for sideband signaling. CC pins may be used to detect connections, determine plug orientation, and may facilitate baseband communications. Power pins may be configured to deliver power for standard USB operation as well as system operation and battery charging or supply power to an active cable. Ground pin may include a ground return current path.

As shown in FIGS. 5-18, second surface 144 also may include a housing column 146. More specifically, housing column 146 may perpendicularly extending down from second surface 144 and then bend parallel to second surface to form a substantially L-shape. Further, housing column 146 may include through-holes positioned to receive, respectively, each soldering cups 124*a*, 124*b*, or 124*c* projecting from rear surface 114 of insert 109 for electrically coupling XLR connector 120 to PCB 104.

As mentioned above, housing 106 may include an opening 108 configured to receive PCB 104 and insert 109. As further illustrated in FIG. 5 and FIG. 6, housing 106 may include an aperture 148 adapted to receive grounding screw 134. More specifically, insert 109 may be secured to housing 106 via grounding screw 134, which is inserted into aperture 148 and aligned to connect or engage with grounding bracket 126.

As shown in the configuration of FIG. 5 and FIGS. 7-12, aperture 148 may positioned on a side of housing 106. Grounding screw 134 may be inserted via aperture 148 for engaging with second leg 132 of grounding bracket 126. Further, side surface 111 of insert 109 may include a notch 150 adapted to receive and support an end of grounding screw 134.

Alternatively, as shown in the configuration of FIG. 6 and FIGS. 13-18, aperture 148 may positioned on a top of housing 106. Grounding screw 134 may be inserted via aperture for engaging with a curved portion 138 of grounding bracket 126. In this configuration, top surface 113 of insert 109 may include notch 150 for receiving and support an end of grounding screw 134. Although not shown, it is further contemplated that housing may include two or more apertures for securing two or more grounding screws to insert 109.

It is further contemplated that a kit may be provided for retrofitting certain above disclosed features and components to other microphones or audio equipment. For instances, other microphones or audio equipment may lack one or more interfaces, a PCB, and/or other features disclosed herein. For example, the kit may include insert 109, digital port 114, analog connector 116, and grounding bracket 126. In one aspect, the kit may include Type-C USB port 118, XLR connector 120, and PCB 104. It is further contemplated that the kit may include housing 106 or another casing configured to mount and secure to a microphone or audio device. The kit also may include all necessary wiring, mounts, cables, fasteners, and other hardware required to install the components of the kit.

Figure 19:
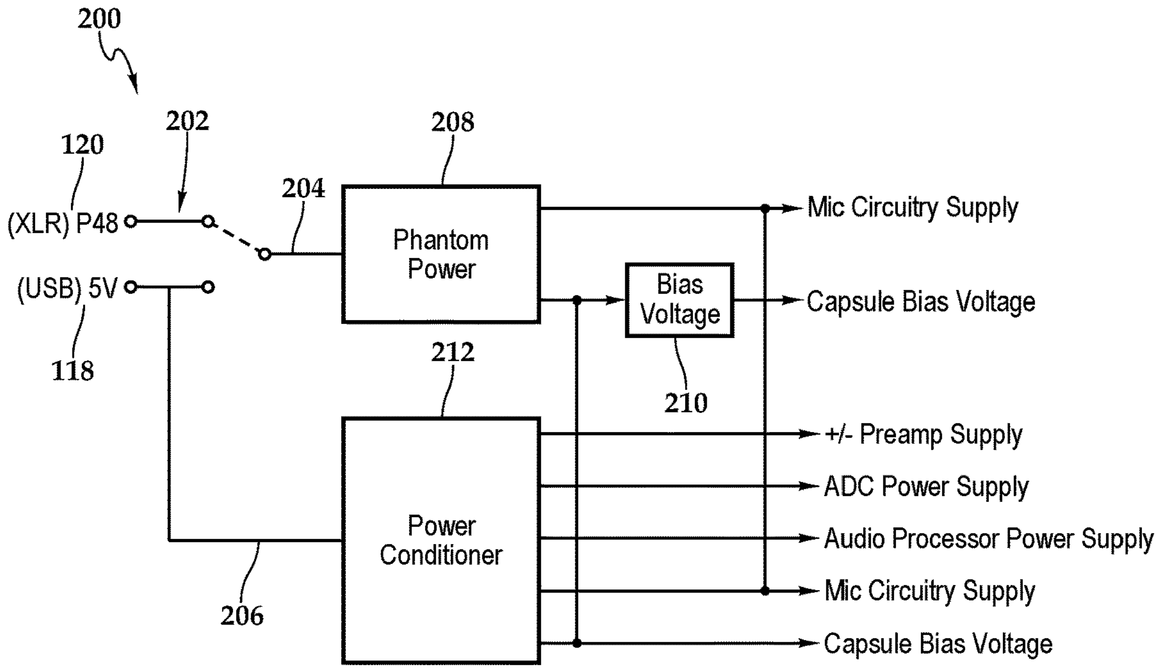
FIG. 19 illustrates an exemplary power supply circuit of the microphone of FIG. 1.

FIG. 19 illustrates an exemplary power supply circuit 200 of microphone 100. Power supply circuit 200 may include one or more semiconductors, such as a Complementary Metal Oxide-Semiconductor (CMOS). Although not shown, microphone 100 may include one or more switching circuits configured to switch from a normally closed position to a normally open position to facilitate changing between operational configurations of microphone 100. For instance, as shown, a switching circuit 202 may be configured to switch between a first configuration 204 and a second configuration 206 of microphone 100. First configuration 204 may correspond to connection of microphone 100 to a host device via analog connector 116. Second configuration 206 may correspond to connection of microphone 100 to a host device via digital port 114.

As illustrated, first configuration 204 correspond to connection of microphone 100 to a host device via XLR connector 120. In this configuration, capsule 102 of microphone 100 may be powered by a phantom supply 208. For example, capsule 102 may be powered by a standard 48 volt DC power that is provided from the host device to microphone 100 as a biasing voltage 210. It is further contemplated that a bias voltage of the actual capsule itself could be anywhere from 3-5 volts for an electret capsule to 200 volts for a measurement microphone for the capsule bias voltage, depending on the type of capsule. As shown, circuit 200 is then configured to distribute the power supply to other components of microphone 100.

Upon detecting that microphone 100 is connected to a host device via digital port 114, such as Type-C USB port 118, the state of circuit 200 may be changed from first configuration 204, e.g., normally closed, to second configuration 206, e.g., normally open. In this configuration, a power conditioner 212 may be configured to generate a separate biasing voltage for applying to the capsule 102 and other components of microphone 100, as detailed below.

Figure 20:
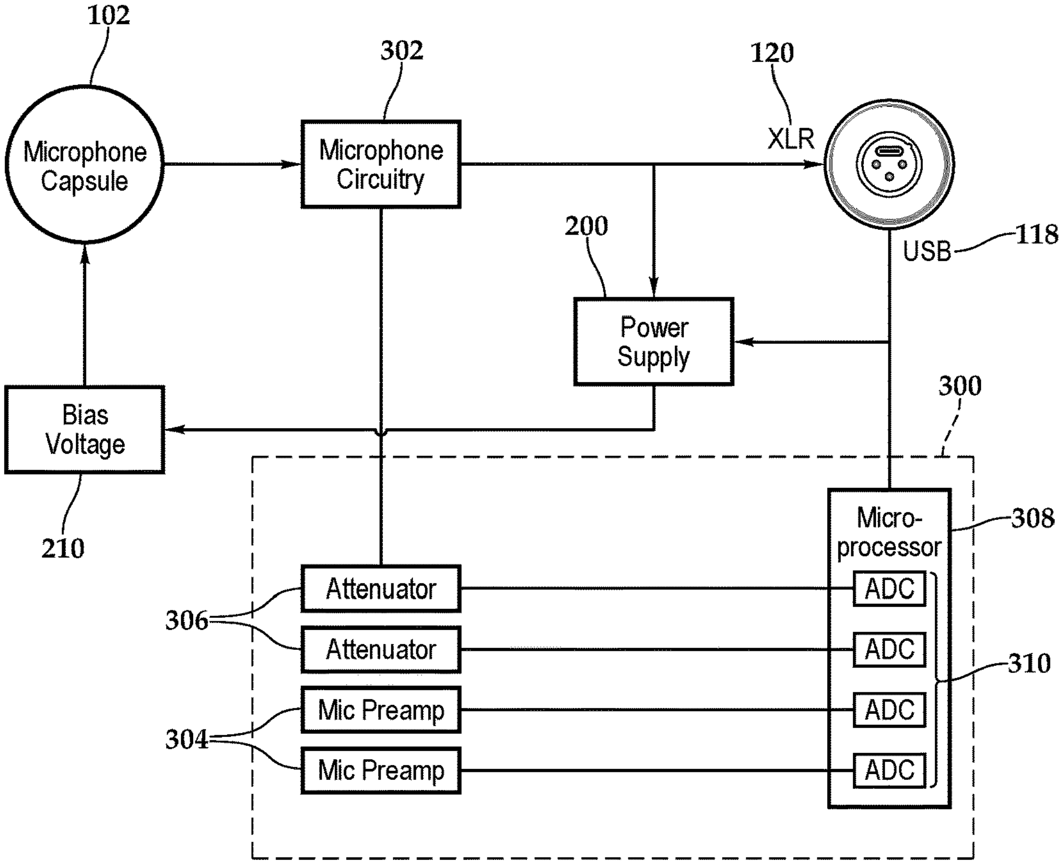
FIG. 20 illustrates an exemplary block circuit diagram of the microphone of FIG. 1.

FIG. 20 illustrates an exemplary circuit block diagram 300 of microphone 100. As shown, in addition to power supply 200 and bias voltage 210, microphone 100 may include processing circuitry 300 and microphone circuitry 302. Microphone circuitry 302 may include, for example, one or more transistors, resistors, and capacitors configured to convert an audio signal received from a microphone capsule, such as capsule 102, to an electrical signal for transmitting to another device, such as via XLR connector 120.

As further shown in FIG. 20, processing circuitry 300 may include one or more microphone preamps 304, one or more passive attenuators 306, and microprocessor 308. Preamp 304 may be configured to amplify an audio signal by a fixed amount or a variable amount. Each attenuator 306 may be configured to reduce a gain level by a fixed amount or a variable amount. Microprocessor 308 may be a digital signal processor (DSP) configured to process audio signals. Further, as shown, microprocessor 308 may include one or more analog-to-digital (ADC) converters 310. The number of ADC converters may correspond to the number of channels available per audio source. Although four ADC converters 310 are shown, the same operations disclosed herein may apply to any ADC codec with more than one channel per input audio source.

Figure 21:
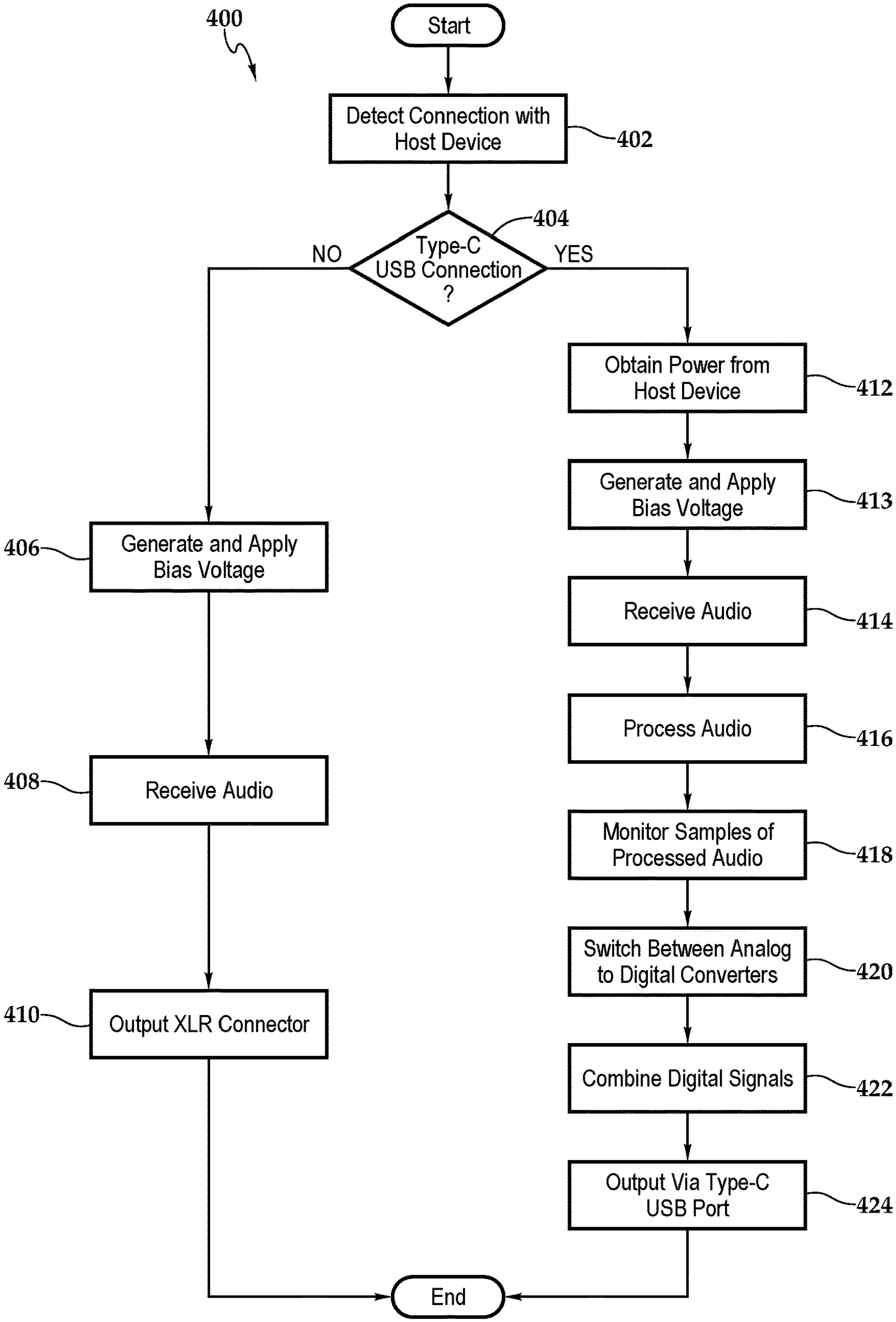
FIG. 21 is a flowchart illustrating an exemplary operation for producing an output signal, such as a 32-bit floating-point recording.

FIG. 21 is a flowchart 400 illustrating the steps of an exemplary operation of microphone 100. The operation begins and, in step 402, microphone 100 detects a connection with a host device, such as a preamp, mixer, audio interface, speaker, computer, mobile device, tablet, and the like. In decision step 404, microphone 100 will determine whether the connection is through a digital port 114, such as a Type-C USB port 118.

If at decision step 404, the connection is not through Type-C USB port 118, in step 406, capsule 102 of microphone 100 may obtain power from the host device via analog connector 120, such as XLR connector 116. For instance, a standard 48 volt DC power may be generated and applied to capsule 102. In step 408, capsule 102 may be configured to receive audio and, in step 410, the audio may be routed directly to XLR connector 116 for output.

If at decision step 404, the connection is through Type-C USB port 118, in step 412, microphone 100 may obtain power from a host device. In step 413, a separate biasing voltage may be generated and applied to capsule 102. In step 414, capsule 102 is configured to receive audio. In step 416, the audio is routed to processing circuitry 300 to enhance the sound and performance of the audio. In particular, processing circuitry 300 may be configured to split the audio signal into two or more processed signals, each processed signal corresponding to a fixed decibel (dB) level offset of the audio signal. For example, the audio signal may be split into four audio signals based on a codec having four channels available per input audio. Further, each processed signal offset according to a fixed decibel level ranging between zero decibels and about sixty decibels.

In step 418, microphone 100 may be configured to simultaneously monitor each processed signal to detect the optimal gain signal. The monitoring may be according to a predetermined sampling interval, such as every eight samples. The term sampling interval may refer to the number of samples in each interval used to determine the optimal gain signal available, corresponding to the signal with the highest signal-to-noise ratio, being the signal with the highest gain without distortion or clipping.

In step 420, for each sample of audio, microphone 100 may be configured to seamlessly and selectively switch between two or more ADC converters. More specifically, microphone 100 may select an ADC from the two or more ADC converters for producing a digital signal based on the optimal gain processed signal monitored at a predetermined sampling interval. The highest gain processed signal may be chosen because it has the best signal-to-noise ratio.

In step 422, microphone 100 may be configured to combine digital signals produced from the two or more ADCs to produce an output signal. Output signal may be a 32-bit floating point audio stream. A 32-bit float recording may facilitate recovering clipped recordings over 0 decibels relative to full scale with zero distortion. Further, the output 32-bit float recording signal may be configured to capture dynamic ranges of up to 1528 dB. This large dynamic range may reduce the requirement for gain adjustments in real time and avoid sorting through dual-recordings in post-production to find unclipped tracks. In step 424, the 32-bit floating point audio stream may be routed to a digital port, such as a Type-C USB port 114.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

The invention claimed is:

1. A microphone comprising:

a capsule configured to receive an audio signal;

an analog connector including one or more pins;

a grounding bracket coupled to said one or more pins of said analog connector;

a digital port configured to be positioned directly adjacent to said one or more pins of said analog connector or vertically between said one or more pins of said analog connector; and a printed circuit board secured between said analog connector and said digital port, said printed circuit board including processing circuitry for generating an output signal, wherein said processing circuitry is configured to split said audio signal into four or more processed signals, each processed signal corresponding to a fixed decibel level offset between about 0 dB and about 60 dB.

2. The microphone of claim 1, wherein said analog connector is a three-pin connector including a ground pin, a positive polarity pin, and a negative polarity pin.

3. The microphone of claim 2, wherein said grounding bracket is connected to said ground pin and secured via a grounding screw.

4. The microphone claim 1, wherein said processing circuitry is further configured to monitor samples, according to a sampling interval, of each processed signal to detect an optimal gain processed signal.

5. The microphone of claim 4, further comprising:

two or more analog-to-digital converters (ADC); and wherein, for each sample, said processing circuitry is configured to selectively switch between said two or more ADCs, wherein a selected ADC corresponds to the optimal gain processed signal, said selected ADC configured to produce a digital signal.

6. The microphone of claim 5, wherein said processing circuitry combines digital signals produced by said two or more ADCs to generate said output signal.

7. The microphone of claim 6, wherein said output signal is a 32-bit floating-point audio stream.

8. The microphone of claim 1, wherein said printed circuit board is a double-sided printed circuit board having a first surface and a second surface, wherein said first surface corresponds to said analog connector and said second surface corresponds to said digital port.

9. The microphone of claim 1, wherein said printed circuit board further comprises switching circuitry for selectively powering said capsule.

10. The microphone of claim 1, wherein said digital port is a USB Type-C connector.

11. A retrofit kit for a microphone or other audio equipment, said kit comprising:

an analog connector including one or more pins;

a grounding bracket coupled to said one or more pins of said analog connector;

a digital port configured to be positioned directly adjacent to said one or more pins of said analog connector or vertically between said one or more pins of said analog connector; and a printed circuit board secured between said analog connector and said digital USB port, said print circuit board including switching circuitry for selectively powering a capsule and processing circuitry for generating an output signal, wherein said processing circuitry is configured to split said audio signal into four or more processed signals, each processed signal corresponding to a fixed decibel level offset between about 0 dB and about 60 dB.

12. The kit of claim 11, wherein said grounding bracket is connected to said ground pin and secured via a grounding screw.

13. The kit of claim 11, wherein said processing circuitry is further configured to monitor samples, according to a sampling frequency, of each processed signal to detect an optimal processed gain signal.

14. The kit of claim 13, further comprising:

two or more analog-to-digital converters (ADC); and wherein, for each sample, said processing circuitry is configured to selectively switch between said two or more ADCs, wherein a selected ADC is configured to produce a digital signal corresponding to said optimal gain signal.

15. The kit of claim 14, wherein said processing circuitry combines digital signals produced by said two or more ADCs to generate said output signal.

16. The kit of claim 15, wherein said output signal is a 32-bit floating-point audio stream.

17. A microphone comprising:

a capsule configured to receive an audio signal;

an analog connector including one or more pins;

a grounding bracket coupled to said one or more pins of said analog connector;

a digital port configured to be positioned directly adjacent to said one or more pins of said analog connector or vertically between said one or more pins of said analog connector;

a printed circuit board secured between said analog connector and said digital port, said printed circuit board including processing circuitry for generating an output signal, said processing circuitry configured to monitor samples, according to a sampling interval, of each processed signal to detect an optimal gain processed signal; and two or more analog-to-digital converters (ADC), wherein, for each sample, said processing circuitry is configured to selectively switch between said two or more ADCs, wherein a selected ADC corresponds to the optimal gain processed signal, said selected ADC configured to produce a digital signal.

18. The microphone of claim 17, wherein said processing circuitry combines digital signals to generate said output signal.

19. A retrofit kit for a microphone or other audio equipment, said kit comprising:

an analog connector including one or more pins;

a grounding bracket coupled to said one or more pins of said analog connector;

a digital port configured to be positioned directly adjacent to said one or more pins of said analog connector or vertically between said one or more pins of said analog connector;

a printed circuit board secured between said analog connector and said digital USB port, said print circuit board including switching circuitry for selectively powering a capsule and processing circuitry for generating an output signal, said processing circuitry configured to monitor samples, according to a sampling interval, of each processed signal to detect an optimal gain processed signal; and two or more analog-to-digital converters (ADC), wherein, for each sample, said processing circuitry is configured to selectively switch between said two or more ADCs, wherein a selected ADC corresponds to the optimal gain processed signal, said selected ADC configured to produce a digital signal.

20. The kit of claim 19, wherein said output signal is a 32-bit floating-point audio stream.

* * * * *